US011810715B2

(12) United States Patent
Hartman et al.

(10) Patent No.: US 11,810,715 B2
(45) Date of Patent: *Nov. 7, 2023

(54) ELECTROMAGNETIC PROPULSION SYSTEM

(71) Applicant: Honeywell Federal Manufacturing & Technologies, LLC, Kansas City, MO (US)

(72) Inventors: Seth Hartman, Kansas City, MO (US); Erik Timpson, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,630

(22) Filed: Aug. 18, 2022

(65) Prior Publication Data

US 2022/0406506 A1 Dec. 22, 2022

Related U.S. Application Data

(63) Continuation of application No. 16/711,776, filed on Dec. 12, 2019, now Pat. No. 11,469,025.

(51) Int. Cl.
*H01F 7/06* (2006.01)
*H01F 7/17* (2006.01)
(Continued)

(52) U.S. Cl.
CPC .............. *H01F 7/064* (2013.01); *H01F 7/17* (2013.01); *H02K 1/2788* (2022.01); *H02K 5/167* (2013.01);
(Continued)

(58) Field of Classification Search
CPC .......... F41B 6/003; F41B 6/006; H01F 7/064; H01F 7/17; H02K 1/2786; H02K 5/167; H02K 7/09; H02K 41/02; B60L 13/04
(Continued)

(56) References Cited

U.S. PATENT DOCUMENTS 3,435,312 A * 3/1969 Coster .................... H02K 41/02
318/135
3,806,782 A * 4/1974 Matsui ................. H02K 41/031
104/282
(Continued)

FOREIGN PATENT DOCUMENTS

CN 202209908 U * 5/2012
CN 102927848 A * 2/2013
(Continued)

*Primary Examiner* — Alex W Mok
(74) *Attorney, Agent, or Firm* — HOVEY WILLIAMS LLP

(57) ABSTRACT

An electromagnetic propulsion system is provided. The system comprises first and second pluralities of stator coils wound about first and second axes, a plurality of support structures, first and second couplers that surround portions of the first and second pluralities of stator coils, and first and second pluralities of sets of rotor coils wound about axes that are parallel to the first and second axes. The stator coils are configured to receive electric current through an outside controller selecting appropriately coupled stator sections or through a sliding electrical contact system or bearing system to induce at least a first magnetic field. The plurality of support structures supports the first and second plurality of stator coils. The first and second couplers include notches and are oriented so that their notches pass over the plurality of support structures when the couplers move along the stator coils. The couplers may have an adjustable segment to close the notch. The sets of rotor coils are equidistantly attached to the couplers and are configured to receive electric current to induce magnetic fields that interact with the magnetic fields of the stator coils so that magnetic forces are applied to the plurality of rotor coils, thereby propelling the couplers along the stator coils.

20 Claims, 8 Drawing Sheets

(51) Int. Cl.
*H02K 1/2786* (2022.01)
*H02K 5/167* (2006.01)
*H02K 7/09* (2006.01)
*H02K 1/2788* (2022.01)
*F41B 6/00* (2006.01)

(52) U.S. Cl.
CPC ............... *H02K 7/09* (2013.01); *F41B 6/003* (2013.01); *F41B 6/006* (2013.01)

(58) Field of Classification Search
USPC ............................................................ 124/3
See application file for complete search history.

(56) References Cited

U.S. PATENT DOCUMENTS

| | | | | |
|---|---|---|---|---|
| 3,858,522 | A * | 1/1975 | Maki | H02K 41/03 104/282 |
| 3,924,537 | A * | 12/1975 | Matsui | B60L 13/03 104/282 |
| 3,934,183 | A * | 1/1976 | Saufferer | H02K 41/03 104/243 |
| 4,027,597 | A * | 6/1977 | Lang | H02K 41/025 104/294 |
| 4,299,173 | A * | 11/1981 | Arima | B61B 13/08 318/135 |
| 4,432,333 | A * | 2/1984 | Kurherr | F41B 6/00 89/8 |
| 4,709,883 | A * | 12/1987 | Giuliani | B64F 1/04 244/114 R |
| 5,379,864 | A * | 1/1995 | Colby | B66B 7/044 104/284 |
| 6,696,775 | B2 * | 2/2004 | Engel | F41B 6/003 310/135 |
| 7,013,988 | B2 * | 3/2006 | Westmeyer | E21B 7/00 175/2 |
| 7,614,393 | B1 * | 11/2009 | Lu | F42B 6/006 89/1.7 |
| 8,074,579 | B1 * | 12/2011 | Bojiuc | H02N 15/00 318/135 |
| 8,459,519 | B2 * | 6/2013 | Feng | B25C 1/06 227/132 |
| 9,580,188 | B2 * | 2/2017 | Endres | B64F 1/04 |
| 11,469,025 | B2 * | 10/2022 | Hartman | B60L 13/04 |
| 2002/0089238 | A1 * | 7/2002 | Rudy | H02K 41/02 310/12.09 |
| 2005/0155487 | A1 * | 7/2005 | Frasca | F41B 6/00 89/8 |
| 2011/0042521 | A1 * | 2/2011 | Sample | B64G 1/14 244/159.3 |
| 2011/0247519 | A1 * | 10/2011 | Studer | B60L 13/06 104/284 |
| 2013/0249343 | A1 * | 9/2013 | Hunstable | H02K 31/02 310/177 |
| 2014/0331888 | A1 * | 11/2014 | Wernersbach | B60L 13/006 104/282 |
| 2015/0048693 | A1 * | 2/2015 | Prussmeier | B65G 54/02 310/12.09 |
| 2015/0137625 | A1 * | 5/2015 | Achterberg | H01H 1/50 310/12.09 |
| 2017/0343314 | A1 * | 11/2017 | Hartman | F41B 6/003 |
| 2017/0346378 | A1 * | 11/2017 | Hartman | H02K 41/031 |
| 2018/0105396 | A1 * | 4/2018 | Purosto | B66B 7/044 |
| 2019/0352128 | A1 * | 11/2019 | Korhonen | B66B 7/047 |

FOREIGN PATENT DOCUMENTS

| | | | | |
|---|---|---|---|---|
| EP | | 3569549 A1 * | 11/2019 | ............. B66B 7/044 |
| WO | WO-2006088584 A2 * | | 8/2006 | ............. B64G 1/002 |
| WO | WO-2016206757 A1 * | | 12/2016 | ......... B66B 11/0407 |

* cited by examiner

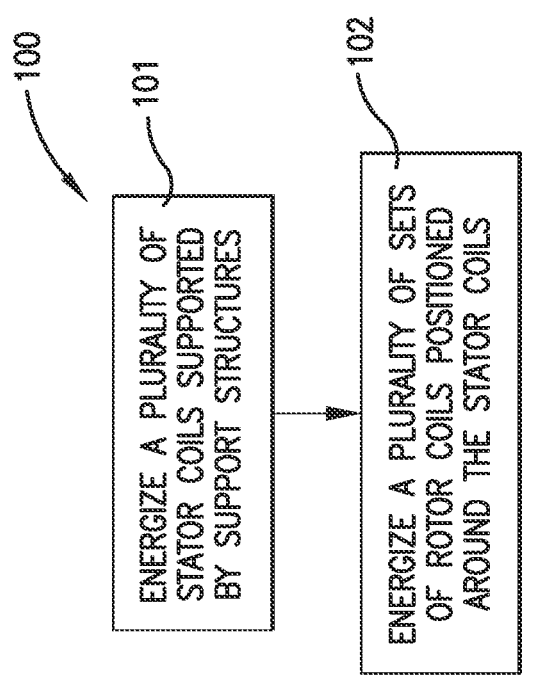

ELECTROMAGNETIC PROPULSION SYSTEM

RELATED APPLICATIONS

The present application is a continuation of and claims priority to co-pending U.S. application Ser. No. 16/711,776, entitled "ELECTROMAGNETIC PROPULSION SYSTEM", filed on Dec. 12, 2019, certain aspects of which are related to previously co-pending non-provisional U.S. application Ser. No. 16/583,459, filed on Sep. 26, 2019, titled "Electromagnetic Propulsion System," both of which are hereby incorporated by reference herein in their entireties.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Electromagnetic propulsion systems are used for accelerating projectiles or objects using magnetic forces. Existing electromagnetic propulsion systems often use an elongated stator having helical stator coils to form a tube. A current is supplied to the stator coils to induce a magnetic field inside the stator along the length of the stator. The magnetic field causes a magnetic force to propel a rotor situated inside the stator coils. The rotor may be a piece of metal, a magnet, or an electromagnet that interacts with the magnetic force. Sometimes it is desired to propel an object external to the stator.

Therefore, some electromagnetic launchers employ a rotor having coils that completely surround the stator so that the magnetic fields of the stator coils and rotor coils efficiently react to one another. However, such a configuration is limited in applications where a stator length is long as great lengths of the stator must be supported at each end.

The background discussion is intended to provide information related to the present invention which is not necessarily prior art.

SUMMARY

The present invention solves the above-described problems and other problems by providing a distinct advance in the art of electromagnetic propulsion systems. More particularly, the present invention provides an electromagnetic propulsion system that enables a track of any length and forming any path.

The electromagnetic propulsion system of the present invention broadly includes a first plurality of stator coils, a plurality of support structures, a first coupler, and a first plurality of sets of rotor coils. The stator coils are wound about a first axis and are configured to receive electric current to induce a first magnetic field. The support structures support the stator coils.

The first coupler surrounds a portion of the first plurality of stator coils and has a notch. The first coupler is oriented so that the notch can pass over one of the plurality of support structures when the first coupler moves along the first plurality of stator coils. The sets of rotor coils are attached to the first coupler equidistant from one another so that the first axis is centered between the sets of rotor coils. The sets of rotor coils are wound about axes that are parallel to the first axis and are configured to receive electric current to induce magnetic fields that interact with the first magnetic field so that magnetic forces are applied to the sets of rotor coils thereby propelling the first coupler along the first plurality of stator coils. Because the rotor coils are wound about an axis external to the stator coils, the coupler is able to have the notch which allows it to pass by the support structures. Therefore, the stator can be supported by the support structures along any point in its length, which allows the stator to extend for any length and follow any path.

The above-described electromagnetic propulsion system may also comprise a method of propelling an object. The method includes energizing a first plurality of stator coils that are wound about a first axis to induce a first magnetic field. The stator coils are supported by a plurality of support structures. The method further includes energizing a first plurality of sets of rotor coils that are equidistantly attached to a first coupler that supports the object. The energizing of the rotor coils induces magnetic fields about the rotor coils that interact with the first magnetic field so that magnetic forces propel the sets of rotor coils which propel the first coupler and the object along the stator coils. A notch in the first coupler passes over the support structures as the coupler moves along the stator coils.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 9 is a flowchart illustrating a method of propelling an object according to an embodiment of the present invention.

Figure 1:
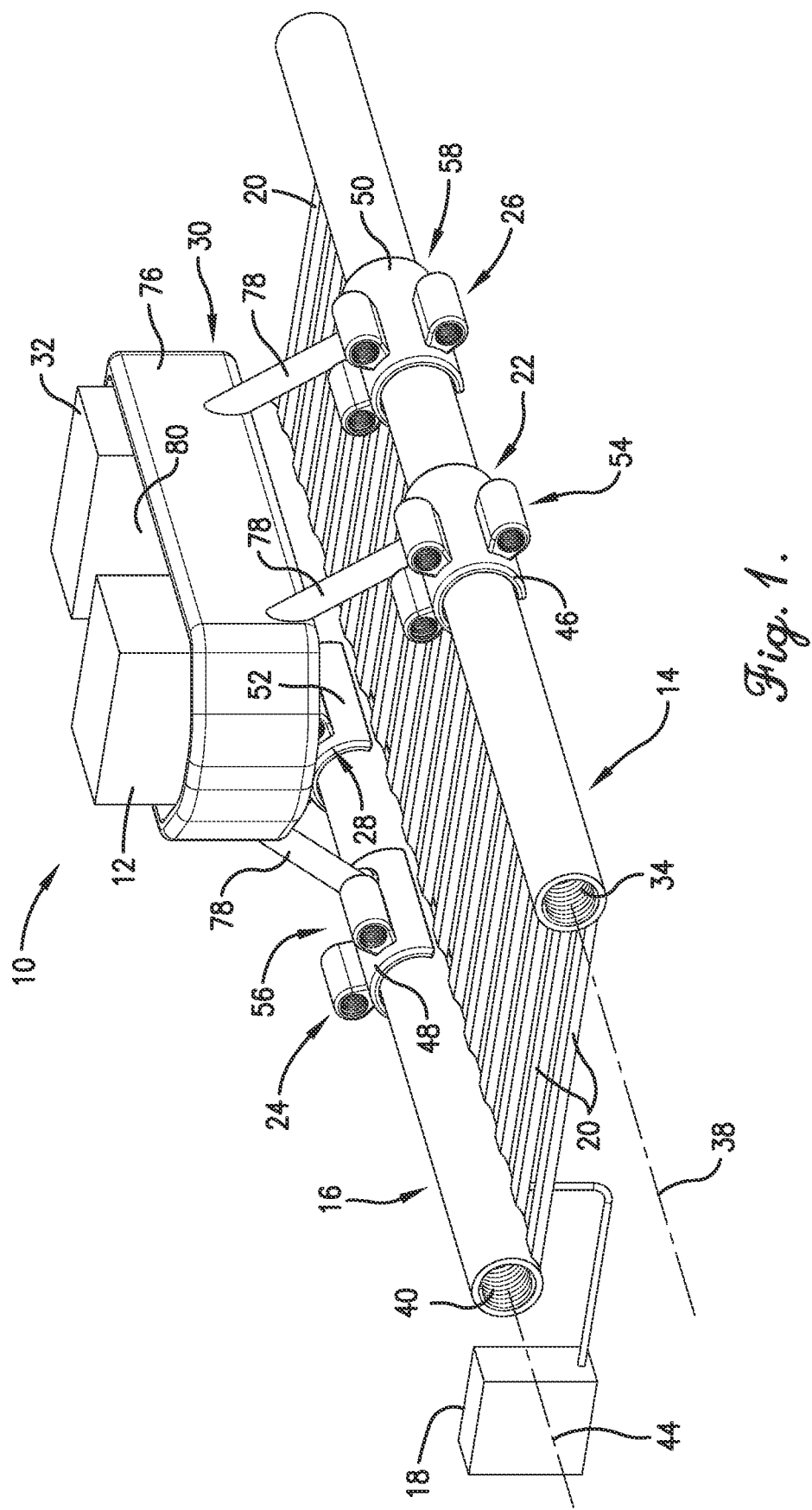
FIG. 1 is perspective view of an electromagnetic propulsion system constructed in accordance with embodiments of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an electromagnetic propulsion system 10 constructed in accordance with an embodiment of the present invention is illustrated. The propulsion system 10 may be implemented for various applications, including for launching projectiles or transporting loads 12, such as objects or people. The propulsion system 10 converts electric power into physical actuation and broadly comprises a pair of stators 14, 16, a stator power source 18, a plurality of support structures 20, a plurality of rotors 22, 24, 26, 28, a chassis 30, and a rotor power source 32.

Figure 2:
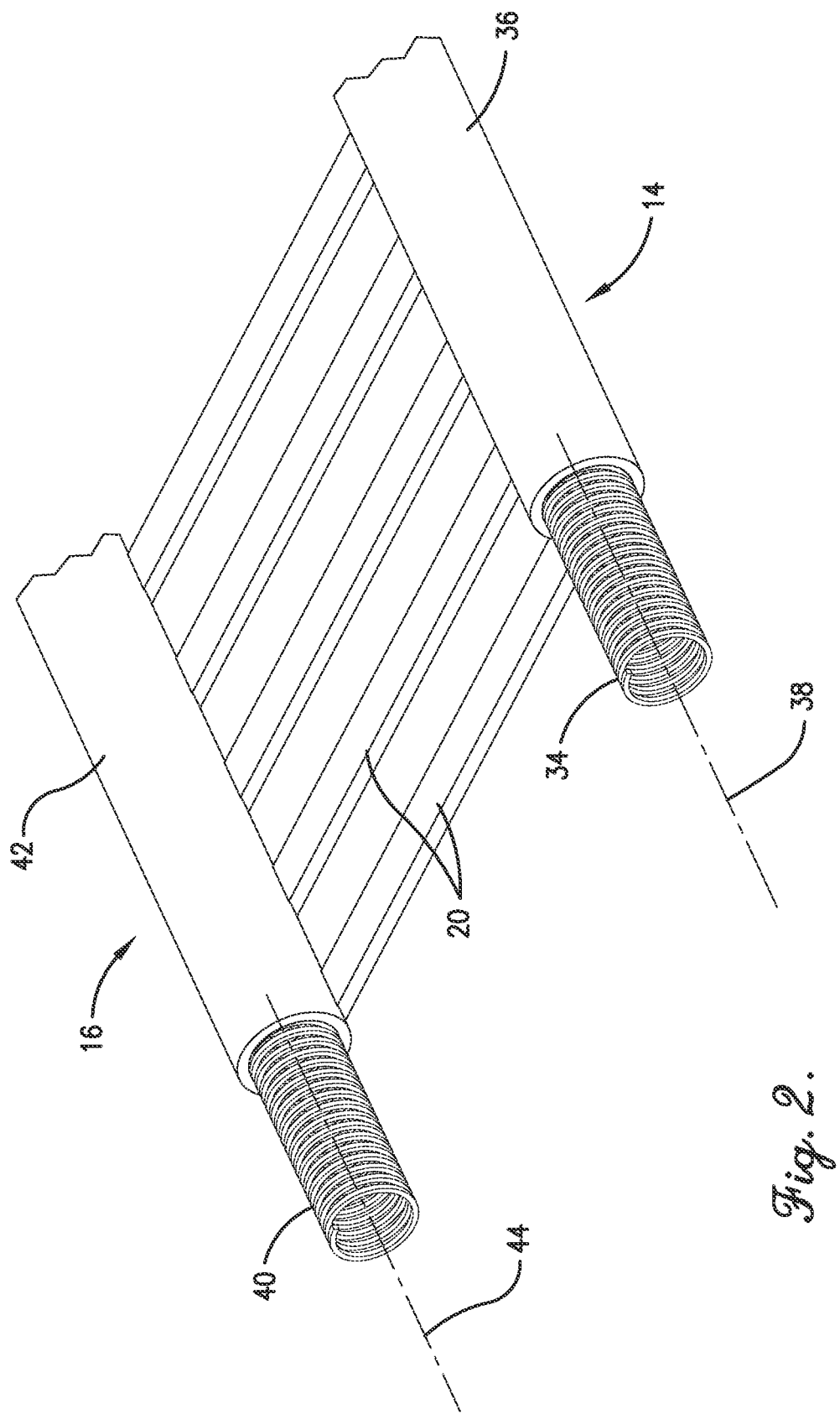
FIG. 2 is a perspective view of the stators of the electromagnetic propulsion system of FIG. 1.

Turning to FIG. 2, the stators 14, 16 generate magnetic fields that interact with magnetic fields of the rotors 22, 24, 26, 28 to propel the chassis 30 along the path of the stators 14, 16. The first stator 14 may include a first plurality of stator coils 34 and a first stator housing 36. The first plurality of stator coils 34 are helically wound about a first axis 38 to form a cylindrical shape. However, the first plurality of stator coils 34 may form any shape and alternatively or additionally comprise a plurality of singular, semi-circular (or other shapes) stator coils without departing from the scope of the present invention. The first plurality of stator coils 34 may be made of metal, alloys, conductive carbon-fiber material, or any other conductive material. The first plurality of stator coils 34 are configured to receive electric current from the stator power source 18 so that the current generates a first magnetic field around the first plurality of stator coils 34.

For example, the first plurality of stator coils 34 may be selectively activated based on the location of the rotors 22, 26 so that the first magnetic field attracts and/or repels the rotors 22, 26. Specifically, a group of stator coils 34 proximate to the rotors 22, 26 may be selectively activated to attract the rotors 22, 26 toward the group of stator coils 34 in order to move the rotors 22, 26 toward the group of stator coils 34. The activated group of stator coils 34 may be operable to stay ahead of the rotors 22, 26 in order to accelerate or maintain a velocity of the chassis 30. Alternatively or additionally, a group of stator coils 34 proximate to the rotors 22, 26 may be selectively activated to repel the rotors 22, 26 away from the group of stator coils 34 in order to move the rotors 22, 26 away from the group of stator coils 34. The activated group of stator coils 34 may stay behind the rotors 22, 26 in order to accelerate or maintain a velocity of the chassis 30. To decelerate the chassis 30, the activated group of stator coils 34 may be operable to have their relative polarities switched in order to apply a magnetic force in the opposite direction of the movement of the rotors 22, 26 while maintaining the activated group of stator coils' 34 proximity to the rotors 22, 26.

The first stator housing 36 supports the first plurality of stator coils 34. The first plurality of stator coils 34 may be attached to the inner and/or outer surface of the first stator housing 36. The first stator housing 36 may also surround and/or envelop the first plurality of stator coils 34 so that the first plurality of stator coils 34 are embedded within the first stator housing 36. The first stator housing 36 may be made of non-conductive material, such as concrete, to prevent shorts in the coils 34. However, the first stator coils 34 may be insulated, such as with rubber or the like, and the first stator housing 36 may include metal or other conductive materials without departing from the scope of the present invention.

The second stator 16 may include a second plurality of stator coils 40 and a second stator housing 42. The second plurality of stator coils 40 are helically wound about a second axis 44 to form a cylindrical shape. The second axis 44 may be parallel to the first axis 38. The second plurality of stator coils 40 may form any shape and alternatively or additionally comprise a plurality of singular, semi-circular (or other shapes) stator coils without departing from the scope of the present invention. The second plurality of stator coils 40 may also be made of metal, alloys, conductive carbon-fiber material, or any other conductive material. The second plurality of stator coils 40 are configured to receive electric current from the stator power source 18 so that the current generates a second magnetic field around the second plurality of stator coils 40.

For example, the second plurality of stator coils 40 may be selectively activated based on the location of the rotors 24, 28 so that the second magnetic field attracts and/or repels the rotors 24, 28. Specifically, a group of stator coils 40 proximate to the rotors 24, 28 may be selectively activated to attract the rotors 24, 28 toward the group of stator coils 40 in order to move the rotors 24, 28 toward the activated group of stator coils 40. The activated group of stator coils 40 may be operable to stay ahead of the rotors 24, 28 in order to accelerate or maintain a velocity of the chassis 30. Alternatively or additionally, a group of stator coils 40 proximate to the rotors 24, 28 may be selectively activated to repel the rotors 24, 28 away from the group of stator coils 40 in order to move the rotors 24, 28 away from the group of stator coils 40. The activated group of stator coils 40 may stay behind the rotors 24, 28 in order to accelerate or maintain a velocity of the chassis 30. To decelerate the chassis 30, the activated group of stator coils 40 may be operable to have their relative polarities switched in order to apply a magnetic force in the opposite direction of the movement of the rotors 24, 28 while maintaining the activated group of stator coils' 40 proximity to the rotors 24, 28.

The second stator housing 42 supports the second plurality of stator coils 40. The second plurality of stator coils 40 may be attached to the inner and/or outer surface of the second stator housing 42. The second stator housing 42 may also surround and/or envelop the second plurality of stator coils 40 so that the second plurality of stator coils 40 are embedded within the second stator housing 42. The second stator housing 42 may be made of non-conductive material, such as concrete, to prevent shorts in the coils 40. However, the second stator coils 40 may be insulated, such as with rubber or the like, and the second stator housing 42 may include metal or other conductive materials without departing from the scope of the present invention. While FIGS. 1 and 2 depict the system 10 having two stators 14, 16, the system 10 may have any number of stators (including one, three, or more) without departing from the scope of the present invention.

The stator power source 18 provides electric current to the stator coils 34, 40 of the stators 14, 16. The electric current may be direct current or alternating current. The connection between the stator power source 18 and the stator coils 34, 40 may be any configuration so that the magnetic fields of the stator coils 34, 40 and the rotors 22, 24, 26, 28 cooperatively apply magnetic forces to the rotors 22, 24, 26, 28. For example, the power source 18 may selectively power any number of coils 34, 40. The stator power source 18 may be a battery, a generator, a converter, a bus, or the like.

The support structures 20 are connected to and support the stators 14, 16. The support structures 20 may be connected to the stator housings 36, 42 and extend between the stators 14, 16, similar to train tracks. However, the support structures 20 may have any shape and be connected to the stators 14, 16 at any angle without departing from the scope of the present invention. For example, it is foreseen that the support structures 20 may connect to a bottom surface of the stators 14, 16 and extend vertically. Alternatively, the support structures 20 may be connected to the stators 14, 16 at an angle to form v-shaped structures. The support structures 20 may be made of any structurally-rigid material, such as concrete, metal, alloys, carbon fiber-reinforced material, or the like.

The rotors 22, 24, 26, 28 are attached to the chassis 30 and are coupled to the stators 14, 16 and configured to interact with the magnetic fields of the stators 14, 16 to propel the chassis 30. The rotors 22, 24, 26, 28 may support the chassis 30 or merely be configured to propel the chassis 30. Rotor 22 and rotor 26 may be positioned coaxially on the same stator 14, and rotor 24 and rotor 28 may be positioned coaxially on the same stator 16. Each rotor 22, 24, 26, 28 includes a coupler 46, 48, 50, 52 and groups of rotor sets 54, 56, 58, 60. While the system 10 is described as having two pairs of coaxial rotors 22, 24, 26, 28, the system 10 may include any number of rotors (including one or more) without departing from the scope of the present invention. Additionally, the system 10 may have any number of rotors on each stator without departing from the scope of the present invention.

Figure 3:
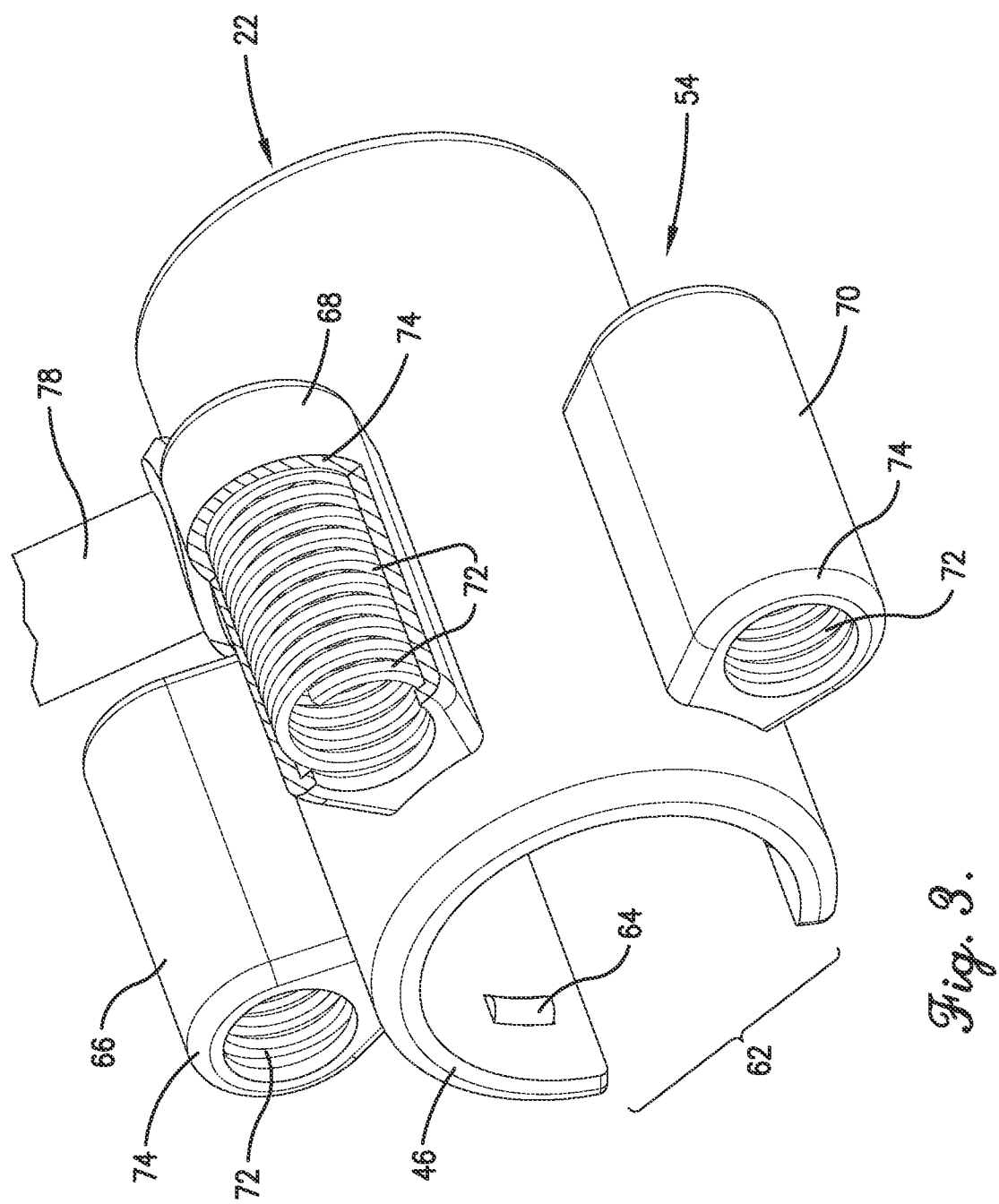
FIG. 3 is an elevated perspective view of a rotor of the electromagnetic propulsion system of FIG. 1.
Figure 4:
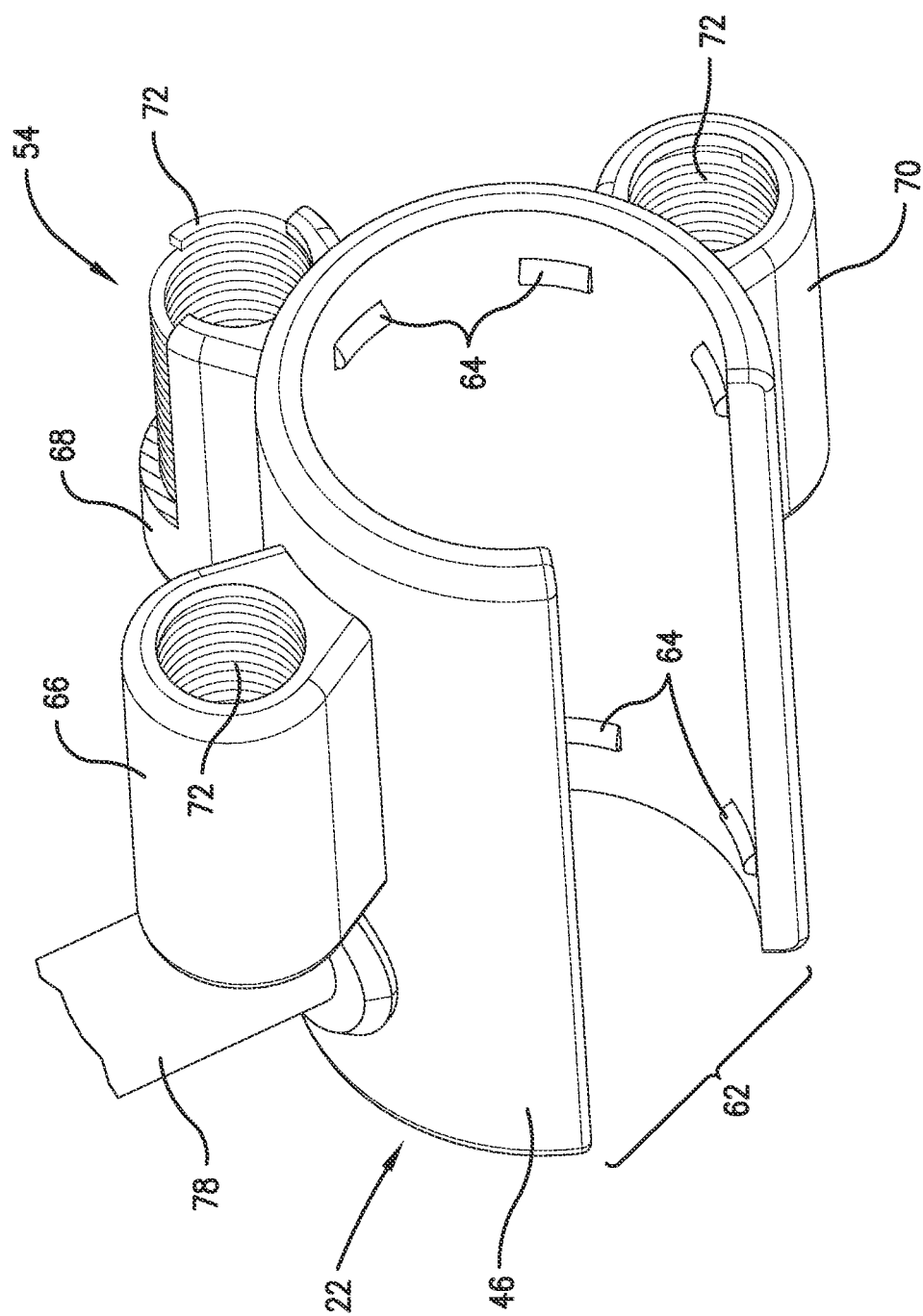
FIG. 4 is a lowered side perspective view of the rotor of FIG. 3.
Figure 5:
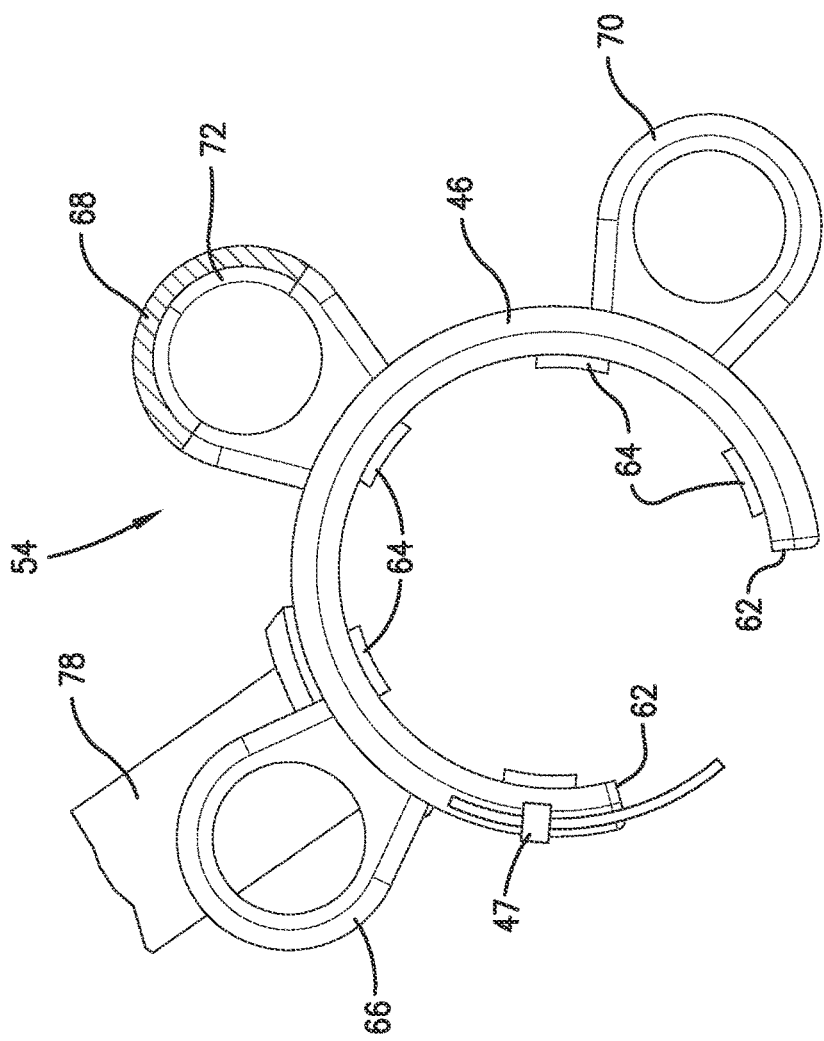
FIG. 5 is a front perspective view of a set of the rotor of FIG. 3.

Turning to FIGS. 3-5, only one rotor 22 is depicted as representing the other rotors 24, 26, 28, which are substantially similar to rotor 22, to avoid cumulative descriptions. The coupler 46 of rotor 22 substantially surrounds the stator 14 and is operable to move along the stator 14. The coupler 46 includes a notch 62 that allows the one or more of the support structures 20 to pass therethrough when the coupler 46 moves along the stator 14. The coupler 46 may be penannular and form a c-shape or any other shape that partially surrounds the stator 14. The notch 62 may be located at any radial position on the coupler 46, i.e. the coupler 46 may be rotated at any angle relative to the stator 14, without departing from the scope of the present invention. The notch 62 may be larger or smaller than a diameter of the stator 14. In embodiments where the notch 62 is smaller than the diameter of the stator 14, the coupler 46 acts as a failsafe in that the rotor 22 and therefore the load 12 will not depart from the stator 14 absent catastrophic failure. Embodiments in which the notch 62 is larger than the diameter of the stator 14 allow for easy removal and coupling of the rotor 22 from and to the stator 14. In some embodiments, the coupler 46 may include a locking mechanism 47 that adjusts the size of the notch 62, as shown in FIG. 5.

The system 10 may include a bearing system 64 between the coupler 46 and the stator 14. The bearing system 64 may include one or more bearings or magnets configured to reduce the friction between the coupler 46 and the stator 14. The bearing system 64 may be installed on the stator 14 and/or the coupler 46.

The group of rotor sets 54 may include any number of rotor coils. Three sets of rotor coils 66, 68, 70 are depicted. The sets of rotor coils 66, 68, 70 may be attached to the coupler 46 and positioned anywhere on the coupler 46. The sets of rotor coils 66, 68, 70 may be radially spaced on the coupler 46 so that they are equidistant from each other. The group of rotor sets 54 may include any number of sets of rotor coils 66, 68, 70 without departing from the scope of the present invention. For example, each rotor 22 may include only one set of rotor coils.

Each set of rotor coils 66, 68, 70 may include a plurality of rotor coils 72 and a rotor housing 74. The rotor coils 72 are configured to receive electric current to induce a magnetic field that interacts with the magnetic field of the stator 14. The interaction of the magnetic fields causes a magnetic force to be applied to the rotor coils 72 which in turn pushes the coupler 46, which pushes the chassis 30. The rotor coils 72 may be helically wound about an axis parallel to the first axis 38. By positioning the rotor coils 72 outside the stator 14 instead of inside the stator 14 or surrounding the stator 14, the coupler 46 is able to have the notch 62 which allows the stator 14 to be supported by the support structures 20. This allows the stator 14 to be any length and define any path. The direction of the winding of the coils 72 does not matter so long as the magnetic field induced by the current going through the coils 72 is consistent among the sets of rotor coils 66, 68, 70. The rotor coils 72 may alternatively or additionally comprise a plurality of singular, semi-circular (or other shapes) rotor coils without departing from the scope of the present invention. The rotor coils 72 may also be made of metal, alloys, conductive carbon-fiber material, or any other conductive material. In some embodiments, the rotor coils 72 comprise superconductor material that are cryogenically cooled.

The rotor housing 74 supports the rotor coils 72. The rotor coils 72 may be attached to the inner or outer surface of the rotor housing 74. The rotor housing 74 may also surround and/or envelop the rotor coils 72 so that the rotor coils 72 are embedded within the rotor housing 74. The rotor housing 74 may be made of non-conductive material, such as plastic or other material, to prevent shorts in the rotor coils 72. However, the rotor coils 72 may be insulated, such as with rubber or the like, and the rotor housing 74 may include metal or other conductive materials without departing from the scope of the present invention.

Turning back to FIG. 1, the chassis 30 supports the load 12 and the rotor power source 32 and is connected to and/or supported by the rotors 22, 24, 26, 28. The chassis 30 may include a body 76 and a plurality of rotor connectors 78. The body 76 may include a cabin 80 for storing the load 12 and/or the rotor power source 32. The rotor connectors 78 connect the rotors 22, 24, 26, 28 to the chassis 30.

The rotor power source 32 may include a battery, capacitor bank, generator, or any other electric power storage and/or generation system. The rotor power source 32 is operable to provide electric current to the rotors 22, 24, 26, 28 so that their rotor coils 72 can generate magnetic fields that interact with the magnetic fields of the stators 14, 16. In some embodiments, the couplers 46, 48, 50, 52 may be configured to pass power to the stators 14, 16 from the power source 32 using sliding electrical contacts, such as contacts 64, to energize an optimal section of the stators 14, 16 as the couplers 46, 48, 50, 52 move along the stators 14, 16. Such embodiments would provide the highest coupling of the fields generated on the stators 14, 16 to the field from the rotor coils 72. In some embodiments, the rotors 22, 24, 26, 28 may receive electric current from stator coils 34, 40. For example, the stator coils 34, 40 may be wound about the stator housings 36, 42, and the bearing system 64 may comprise conductive bearings that contact the stator coils 34, 40, so that electric current is passed to the bearings. The conductive bearings of the bearing system 64 may be in electrical communication with the rotor coils 72 so that the current passes from the bearings to the rotor coils 72. The bearing system 64, stator coils 34, 40, and the rotor coils 72 may have any electrical configuration so long as the magnetic field induced in the coils 34, 40, 72 causes the rotors 22, 24, 26, 28 to be subject to a force. For example, each end of the rotor coils 72 may be connected to a different conductive bearing and/or the rotor coils 72 may be grounded elsewhere, such as at the rotor power source 32.

Figure 6:
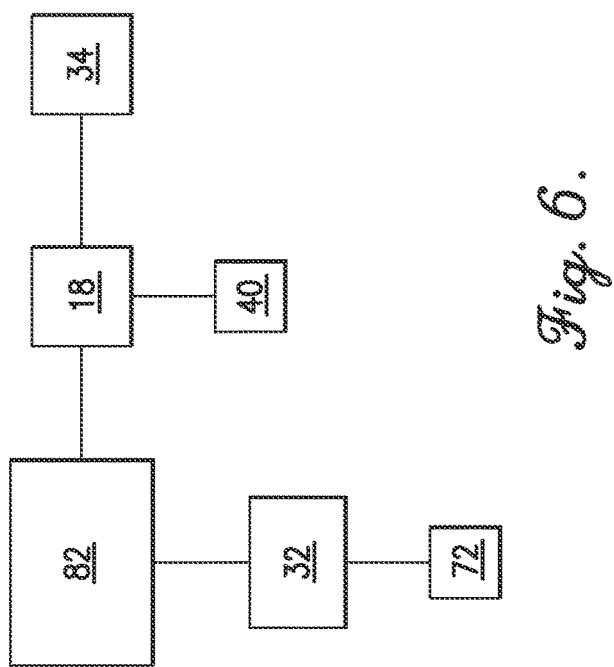
FIG. 6 is a schematic view of a control system of the electromagnetic propulsion system of FIG. 1.

Turning to FIG. 6, the electromagnetic system may include a control system 82 configured to control an amount of current delivered to the stator coils 34, 40 of the stators 14, 16 and/or rotor coils 72 of the rotors 22, 24, 26, 28. The control system 82 may also be configured to control a direction of the movement of, or the force applied to, the rotors 22, 24, 26, 28 and chassis 30. The control system 82 may be in communication with the stator power source 18 and/or the rotor power source 32. For example, the control system 82 may be configured to increase or decrease an amount of current supplied to the stator coils 34, 40 of one or more of the stators 14, 16 and/or to the rotor coils 72 of one or more of the rotors 22, 24, 26, 28 to increase or decrease the magnetic force resulting therefrom to cause the chassis 30 to accelerate or decelerate. The control system 82 may be configured to switch the direction of the current supplied to the stators 14, 16 and/or rotors 22, 24, 26, 28 in order to decelerate and/or reverse the direction of the rotors 22, 24, 26, 28 and chassis 30.

The control system 82 may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, amplifiers, other electrical and computing devices, and/or residential or external memory for storing data and other information accessed and/or generated by the electromagnetic propulsion system 10.

The control system 82 may control and/or sense operational sequences, power, speed, motion, or movement of the rotors 22, 24, 26, 28 and/or the chassis 30. Portions of the control system 82 may be positioned on the chassis 30, rotors 22, 24, 26, 28, and/or stators 14, 16, including switches, controllers, sensors, transceivers, etc. For example, switches may be physically located on the stators 14, 16, the chassis 30, and/or the rotors 22, 24, 26, 28 and could supply power to the stators 14, 16 and/or the rotors 22, 24, 26, 28 when directed to by the control system 82. The switches could also be in a multiplexor consisting of silicon-controlled rectifiers (SCRs), connected to the stators 14, 16 and/or rotors 22, 24, 26, 28.

In use, the stator power source 18 supplies electric current to the stator coils 34, 40 of the stators 14, 16. The current traveling through the stator coils 34, 40 generates a magnetic field about the stators 14, 16. To accelerate the chassis 30, the rotor power source 32 may supply electric current to the rotor coils 72 of the rotors 22, 24, 26, 28. The electric current traveling through the rotor coils 72 induces magnetic fields about the sets of rotor coils 66, 68, 70. The magnetic fields generated by the sets of rotor coils 66, 68, 70 interact with the magnetic fields of the stators 14, 16 thereby causing magnetic forces to be applied to the sets of rotor coils 66, 68, 70. The magnetic forces push the sets of rotor coils 66, 68, 70, which then push their respective coupler 46, 48, 50, 52. The couplers 46, 48, 50, 52 thereby accelerate the chassis 30 along the stators 14, 16. The stator power source 18 and/or the rotor power source 32 may adjust the current to their respective coils 34, 40, 72 in order to affect the magnitude of the magnetic force and thereby affect the velocity of the chassis 30.

For example, the control system 82 may be configured to selectively activate portions of the stator coils 34, 40 based on the location of the rotors 22, 24, 26, 28 so that the magnetic fields of the stators 14, 16 attract and/or repel the rotors 22, 24, 26, 28. The control system 82 may be configured to selectively activate a portion of the stator coils 34, 40 proximate to the rotors 22, 24, 26, 28 to attract the rotors 22, 24, 26, 28 toward the group of stator coils 34, 40 in order to move the rotors 22, 24, 26, 28 toward the activated portion of stator coils 34, 40. The control system 82 may be configured to activate portions of the stator coils 34, 40 ahead of the rotors 22, 24, 26, 28 in order to accelerate or maintain a velocity of the chassis 30.

Alternatively or additionally, the control system 82 may selectively active a portion of the stator coils 34, 40 proximate to the rotors 22, 24, 26, 28 to repel the rotors 22, 24, 26, 28 away from the activated portion of stator coils 34, 40 in order to move the rotors 22, 24, 26, 28 away from the activated portion of stator coils 34, 40. The control system 82 may be configured to activate portions of the stator coils 34, 40 behind the rotors 22, 24, 26, 28 in order to accelerate or maintain a velocity of the chassis 30.

To decelerate and/or reverse the direction of the chassis 30, the control system 82 may be configured to selectively activate portions of the stator coils 34, 40 with a different current direction to switch the polarities of the magnetic fields of the activate portions of the stator coils 34, 40. This results in a magnetic force being applied to the rotors 22, 24, 26, 28 in the opposite direction of the movement of the rotors 22, 24, 26, 28.

Figure 7:
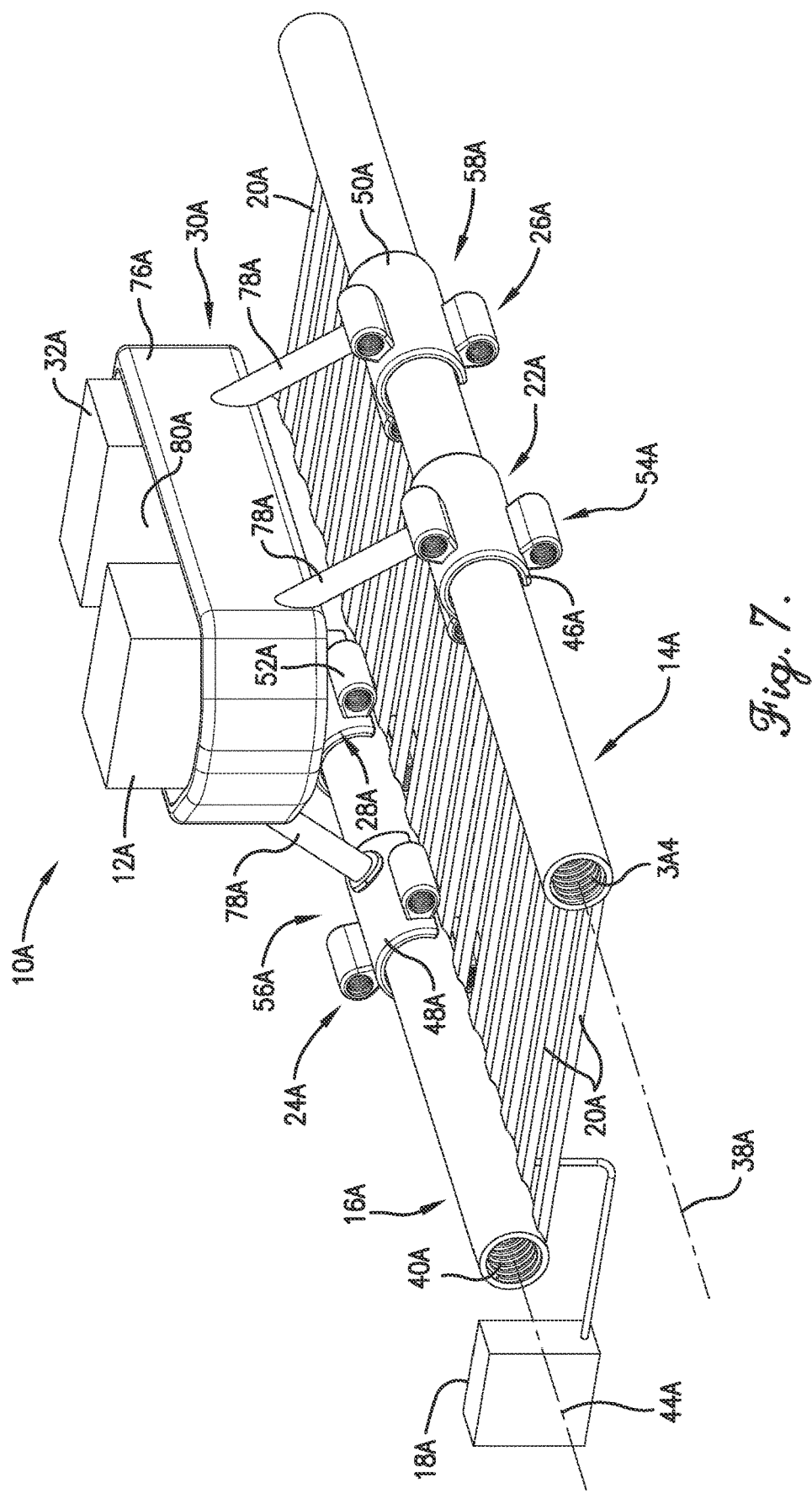
FIG. 7 is a perspective view of an electromagnetic propulsion system according to another embodiment of the invention.
Figure 8:
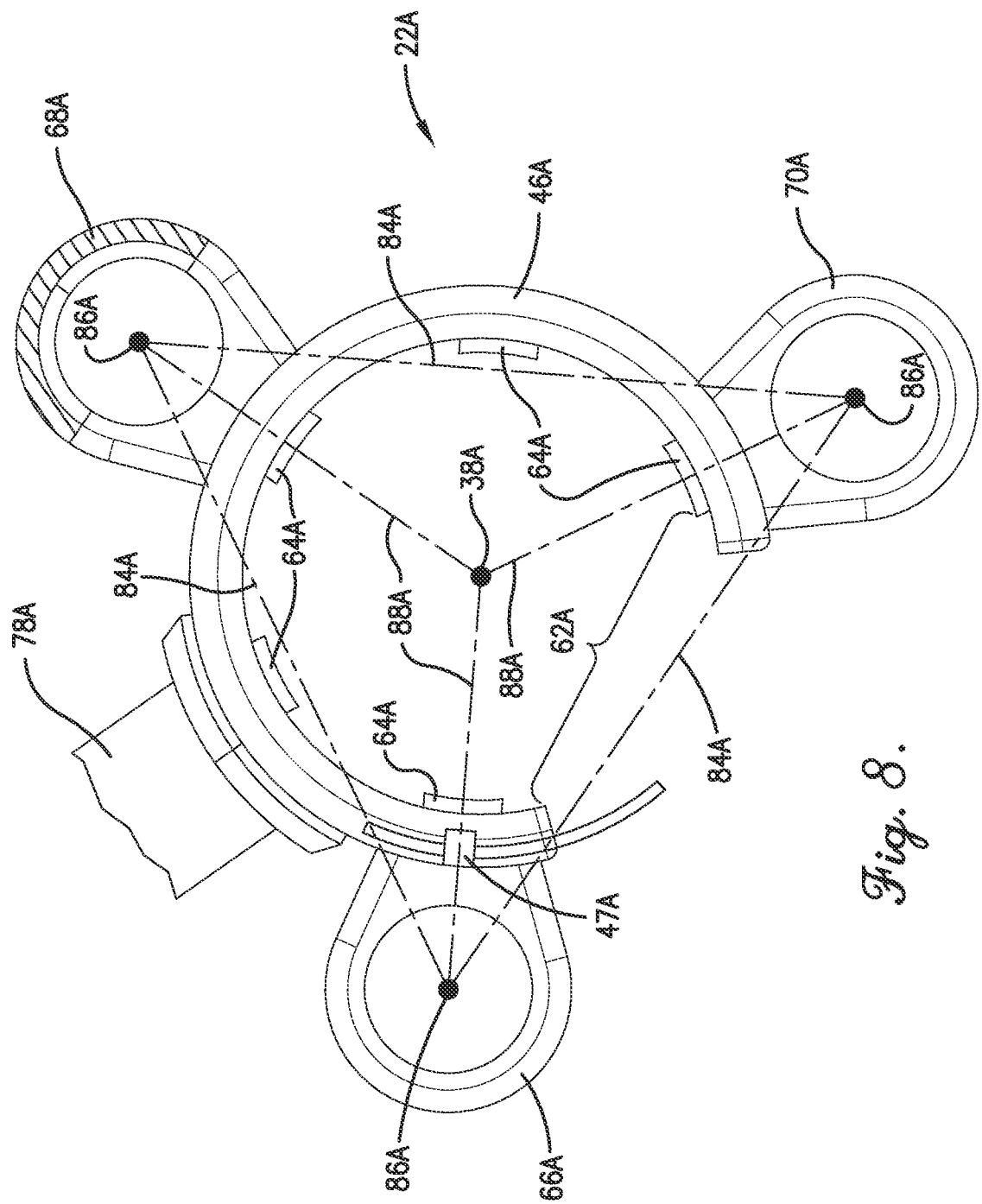
FIG. 8 is a perspective view of a plurality of sets of rotor coils of the electromagnetic propulsion system of FIG. 7.

An electromagnetic propulsion system 10A constructed in accordance with another embodiment of the invention is shown in FIGS. 7 and 8. The system 10A may comprise substantially similar components as electromagnetic propulsion system 10; thus, the components of system 10A that correspond to similar components in system 10 have an 'A' appended to their reference numerals.

The system 10A includes all the features of system 10 except that the sets of rotor coils are equidistantly spaced on their respective couplers. For example, as shown in FIG. 8, the sets of rotor coils 66A, 68A, 70A of each rotor 22A, 24A, 26A, 28A are spaced apart so that they triangulate the stator 14A with the central axis 38A of the stator 14A being centered between the sets of rotor coils 66A, 68A, 70A. In other words, the lateral distances 84A between the centers 86A of the rotor coils 66A, 68A, 70A are equal. In some embodiments, the radial distances 88A from the central axis 38A to the centers 86A of the rotor coils 66A, 68A, 70A are also equal. The rotors 22A, 24A, 26A, 28A may have any number of sets of rotor coils 66A, 68A, 70A without departing from the scope of the present invention, so long as the sets of rotor coils are equally spaced apart on the coupler 46 so that they triangulate the central axis 38A of the stator 14A. For example, the rotors 22A, 24A, 26A, 28A may each have only two sets of rotor coils that are diametrically opposed with the central axis 38A being the midpoint between the centers 86A of the rotor coils. As another example, the rotors 22A, 24A, 26A, 28A may each have four sets of rotor coils whose lateral distances 84A between their centers 86A are equal, the lateral distances 84A thereby forming a square, with the center of the square being at the central axis 38A of the stator 14A.

The flow chart of FIG. 9 depicts the steps of an exemplary method 100 of propelling an object. In some alternative implementations, the functions noted in the various blocks may occur out of the order depicted in FIG. 9. For example, two blocks shown in succession in FIG. 9 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-8. The steps of the method 100 may be performed by the control system 82 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, a first plurality of stator coils is energized. The stator coils may be wound about a first axis. The energizing of the stator coils includes receiving an electric current, including alternating current and/or direct current, which induces a first magnetic field about the stator coils. The stator coils may be selectively energized so that only one or more coils are energized. The stator coils may be supported by support structures. Additionally, the stator coils may be enclosed in a housing that is connected to the support structures. In some embodiments, this step includes energizing a second plurality of stator coils that are wound about a second axis. The second plurality of stator coils may be supported by the support structures. The second axis may be parallel with the first axis. The first stator coils and the second stator coils may be energized cooperatively to induce magnetic fields with substantially similar flux.

Referring to step 102, a first plurality of sets of rotor coils are energized to induce magnetic fields in the rotor coils that interact with the magnetic field of the stator coils so that magnetic forces are applied to the rotor coils that propel the rotor coils, which help propel the object. The energizing of the sets of rotor coils may include injecting alternating current and/or direct current into the rotor coils. The sets of rotor coils may be wound about axes radially distanced from, but parallel to, the first axis. The sets may be attached to a first coupler that partially surrounds the first plurality of stator coils. The sets of rotor coils may be attached at locations on the coupler so that the sets of rotor coils are equidistantly spaced on the coupler and/or surround the central axis of the stator at equal radial distances. The coupler may have a notch that allows the coupler to pass by the support structures when the coupler moves along the stator coils. The coupler may support a chassis which holds the object. The chassis may also be supported by a second coupler engaged with the second plurality of stator coils. A second plurality of sets of rotor coils may be equidistantly attached to the second coupler. The first and second plurality of rotor coils may be operable to cooperatively propel the chassis.

The method 100 may include additional, less, or alternate steps and/or device(s), including those discussed elsewhere herein. For example, the method 100 may include a step of decelerating the object by reversing a polarity of current in the stator coils or rotor coils or selectively energizing certain stator coils to induce a magnetic field that interacts with the magnetic fields of the rotor coils so that magnetic forces push the rotor coils in a direction opposite to the movement of the object.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An electromagnetic propulsion system comprising:
   a first plurality of stator coils wound about a first axis and configured to receive electric current to induce a first magnetic field;
   a plurality of support structures that support the first plurality of stator coils;
   a first coupler that surrounds a portion of the first plurality of stator coils and having a notch, the first coupler being oriented so that the notch can pass over one of the plurality of support structures when the first coupler moves along the first plurality of stator coils; and
   a first plurality of sets of rotor coils attached to the first coupler and spaced around the first axis, the first plurality of sets of rotor coils being wound about axes that are parallel to the first axis and configured to receive electric current to induce magnetic fields that interact with the first magnetic field so that magnetic forces are applied to the first plurality of sets of rotor coils thereby propelling the first coupler along the first plurality of stator coils and providing a magnetic levitation force between the first plurality of sets of rotor coils and the first plurality of stator coils.

2. The system of claim 1, wherein the first plurality of sets of rotor coils comprises three sets of rotor coils.

3. The system of claim 2, the three sets of rotor coils being attached to the first coupler at locations on the first coupler so that the three sets of rotor coils triangulate the first axis.

4. The system of claim 1, further comprising a chassis supported by the first coupler.

5. The system of claim 4, further comprising—
an energy storage device positioned on the chassis and electrically connectable to the first plurality of sets of rotor coils; and
at least one of a sliding contact system or bearing system operable to supply power from the energy storage device to one or more of the first plurality of stator coils located in front or behind the first plurality of sets of rotor coils.

6. The system of claim 4, further comprising—
a second plurality of stator coils wound about a second axis and supported by the plurality of support structures, the second plurality of stator coils being configured to receive electric current to induce a second magnetic field;
a second coupler supporting the chassis and surrounding a portion of the second plurality of stator coils and having a notch, the second coupler being oriented so that the notch can pass over one of the plurality of support structures when the second coupler moves along the second plurality of stator coils; and
a second plurality of sets of rotor coils attached to the second coupler and spaced around the second axis, the second plurality of sets of rotor coils being wound about axes that are parallel to the second axis and configured to receive electric current to induce magnetic fields that interact with the second magnetic field so that magnetic forces are applied to the second plurality of sets of rotor coils thereby propelling the chassis cooperatively with the first plurality of sets of rotor coils.

7. The system of claim 4, further comprising a control system positioned on the chassis and configured to control an amount of electric current delivered to the first plurality of sets of rotor coils.

8. The system of claim 7, the control system being operable to reverse a direction of the magnetic force.

9. The system of claim 4, further comprising—
a coaxial coupler supporting the chassis and surrounding a different coaxial portion of the first plurality of stator coils and having a notch, the coaxial coupler being oriented so that the notch can pass over one of the plurality of support structures when the coaxial coupler moves along the first plurality of stator coils; and
a coaxial plurality of sets of rotor coils attached to the coaxial coupler and spaced around the first axis, the coaxial plurality of sets of rotor coils being wound about axes that are parallel to the first axis and being configured to receive electric current to induce magnetic fields that interact with the first magnetic field so that magnetic forces are applied to the coaxial plurality of sets of rotor coils thereby propelling the chassis cooperatively with the first plurality of sets of rotor coils.

10. The system of claim 1, further comprising a cylindrical housing that houses the first plurality of stator coils and is supported by the plurality of support structures, wherein the first plurality of stator coils are positioned on at least one of the following locations: an inner surface of the cylindrical housing, an internal portion of a wall of the cylindrical housing, or an outer surface of the cylindrical housing.

11. The system of claim 10, further comprising a bearing system for reducing friction between the first coupler and the cylindrical housing.

12. The system of claim 11, wherein the bearing system includes superconducting magnets configured to maintain the first coupler in a levitated position.

13. The system of claim 1, further comprising—
a chassis supported by the first coupler;
a first energy storage device positioned on the chassis and configured to supply power to the first plurality of sets of rotor coils;
a second energy storage device configured to supply power to one or more of the first plurality of stator coils; and
a control system configured to selectively connect the one or more of the first plurality of stator coils to the second energy storage device.

14. A method of propelling an object, the method comprising:
energizing a first plurality of stator coils that are wound about a first axis to induce a first magnetic field, the stator coils being supported by a plurality of support structures; and
energizing a first plurality of sets of rotor coils that are attached to a first coupler that supports the object, the energizing of the first plurality of sets of rotor coils inducing magnetic fields in the first plurality of sets of rotor coils that interact with the first magnetic field so that magnetic forces propel the first plurality of sets of rotor coils which propel the first coupler and the object along the first plurality of stator coils with a notch in the first coupler passing over the plurality of support structures.

15. The method of claim 14, wherein the first plurality of sets of rotor coils are energized via an energy storage device positioned on a chassis that is attached to the first coupler and that supports the object.

16. The method of claim 15, further comprising controlling, via a control system, an amount of electric current from the energy storage device provided to the first plurality of sets of rotor coils.

17. The method of claim 15, further comprising—
energizing a second plurality of stator coils that are wound about a second axis to induce a second magnetic field, the second plurality of stator coils being supported by the plurality of support structures; and
energizing a second plurality of sets of rotor coils that are attached to a second coupler that supports the chassis, the energizing of the second plurality of sets of rotor coils inducing magnetic fields in the second plurality of sets of rotor coils that interact with the second magnetic field so that magnetic forces propel the second plurality of sets of rotor coils which push the second coupler along the second plurality of stator coils with a notch in the second coupler passing over the plurality of support structures.

18. The method of claim 14, wherein the energizing of the first plurality of stator coils comprises selectively energizing one or more of the first plurality of stator coils located axially in front of or behind the associated rotor coils.

19. The method of claim 14, further comprising energizing the first plurality of stator coils to induce a second magnetic field that interacts with the magnetic fields of the first plurality of sets of rotor coils so that magnetic forces decelerate the first plurality of sets of rotor coils, thereby decelerating the object.

20. An electromagnetic propulsion system comprising:
a first plurality of stator coils wound about a first axis and configured to receive electric current to induce a first magnetic field;
a second plurality of stator coils wound about a second axis and configured to receive electric current to induce a second magnetic field;

a plurality of support structures that support the first plurality of stator coils and the second plurality of stator coils;

a first coupler that surrounds a portion of the first plurality of stator coils and having a notch, the first coupler being oriented so that the notch can pass over one of the plurality of support structures when the first coupler moves along the first plurality of stator coils;

a second coupler that surrounds a portion of the second plurality of stator coils and having a notch, the second coupler being oriented so that the notch can pass over one of the plurality of support structures when the second coupler moves along the second plurality of stator coils;

a chassis supported by the first coupler and the second coupler;

a first plurality of sets of rotor coils attached to the first coupler and spaced around the first axis, the first plurality of sets rotor coils being wound about axes that are parallel to the first axis and configured to receive electric current to induce magnetic fields that interact with the first magnetic field so that magnetic forces are applied to the first plurality of sets of rotor coils; and a second plurality of sets of rotor coils attached to the second coupler and spaced around the second axis, the second plurality of sets of rotor coils being wound about axes that are parallel to the second axis and configured to receive electric current to induce magnetic fields that interact with the second magnetic field so that magnetic forces are applied to the second plurality of sets of rotor coils thereby propelling the chassis cooperatively with the first plurality of sets of rotor coils.

* * * * *